United States Patent
Kim et al.

(10) Patent No.: US 6,304,562 B1
(45) Date of Patent: Oct. 16, 2001

(54) ASYMMETRIC FORWARD POWER CONTROL IN A CDMA COMMUNICATION

(75) Inventors: Youngky Kim; Jaemin Ahn; Heewon Kang, all of Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/010,213

(22) Filed: Jan. 21, 1998

Related U.S. Application Data
(60) Provisional application No. 60/050,870, filed on Jun. 26, 1997.

(51) Int. Cl.[7] .............................. H04Q 7/20; H04B 7/216
(52) U.S. Cl. ........................ 370/332; 370/335; 455/522
(58) Field of Search ...................... 370/328, 332, 370/335, 341, 342, 431, 441, 331; 455/13.4, 522

(56) References Cited

U.S. PATENT DOCUMENTS

| | | | |
|---|---|---|---|
| 4,358,844 | 11/1982 | Pirani | 370/342 |
| 4,754,453 | 6/1988 | Eizen höfer | 370/337 |
| 4,901,307 | 2/1990 | Gilhousen et al. | 370/320 |
| 5,056,109 | 10/1991 | Gilhousen et al. | 370/342 |
| 5,101,501 | 3/1992 | Gilhousen et al. | 455/442 |
| 5,103,459 | 4/1992 | Gilhousen et al. | 370/206 |
| 5,218,618 | 6/1993 | Sagey | 375/130 |
| 5,267,261 | 11/1993 | Blakeney, II et al. | 370/332 |
| 5,563,883 | 10/1996 | Cheng | 370/449 |
| 5,570,367 | 10/1996 | Ayanoglu et al. | 370/346 |
| 5,604,473 | * 2/1997 | Tiedemann, Jr. | 370/252 |
| 5,621,723 | 4/1997 | Walton, Jr. et al. | 370/335 |
| 5,640,414 | * 6/1997 | Blakeney, II et al. | 375/200 |
| 5,799,005 | * 8/1998 | Soliman | 370/335 |
| 5,841,806 | * 11/1998 | Gilhousen et al. | 375/206 |
| 5,884,187 | * 3/1999 | Ziv et al. | 455/522 |
| 5,999,816 | * 12/1999 | Tiedemann, Jr. et al. | 455/437 |

OTHER PUBLICATIONS

"Wellcome to the World of CDMA," Website of *CDMA Development Group*(www.cdg.org), Dec. 1997.

* cited by examiner

Primary Examiner—Hassan Kizou
Assistant Examiner—Saba Tsegaye
(74) Attorney, Agent, or Firm—John C. Han

(57) ABSTRACT

In a CDMA communication system, a method and system for controlling forward link power by a mobile station in a handover state. The method and system include transmitting different power control bits to each base station to independently control the transmission power of each base station.

20 Claims, 5 Drawing Sheets

ASYMMETRIC FORWARD POWER CONTROL IN A CDMA COMMUNICATION

This application claims the benefit under Title 35 United States Code §119(e) of U.S. Provisional Application No. 60/050,870, filed Jun. 26, 1997.

FIELD OF THE INVENTION

The present invention generally relates to code division multiple access (CDMA) communication systems and, more particularly, to a system and method for controlling power on the forward link from a mobile station to a base station.

BACKGROUND OF THE INVENTION

One type of cellular communication system employs a technology known as CDMA (code division multiple access). In this system, users are distinguished from one another by unique codes assigned to them while sharing the same frequency band at the same time. Since all the users are using the same frequency band, users interfere with each other. The level of interference must be controlled to provide the intended quality of service, that is, to reduce the rate of errors below an acceptable level. For further description of CDMA and the differences between CDMA, TDMA (time division multiple access), and FDMA (frequency division multiple access), please see "Code Division Multiple Access," *Communications*, February 1990, by Fred Baumgartner, hereby incorporated by reference.

FIG. 1 graphically illustrates a CDMA-based communication system comprising a mobile station 10, a base station 20, reverse link 30 which represents the electromagnetic wave communication link transmitted from mobile station 10 to base station 20 and forward link 40 which represents the electromagnetic wave communication link transmitted from base station 20 to mobile station 10.

One method to control the level of interference in a CDMA-based communication system is by way of power control, that is, the power transmitted from the mobile station 10 to the base station 20 (reverse link) or from the base station 20 to the mobile station 10 (forward link) is controlled or varied. Power control on the reverse link is required because of the so-called "near/far" problem. The problem occurs when a mobile station close to a base station undergoes or incurs relatively low power propagation loss, and thus the base station sees a very high level of power from the mobile station, whereas a mobile station located farther out undergoes relatively high propagation loss, and thus the power received by the base station from the mobile station is very low. Power control for the reverse link is thus used to command the nearby and far-out mobile stations to reduce or increase the transmit power to the base station, as is well known in the art.

Due to the variability in the propagation environment as the mobile stations move about, the power control command update rate must be relatively fast. The speed at which the power command update rate occurs in present IS-95 CDMA-based systems is 800 hertz. In past CDMA-based communication systems, it was deemed that the power control on the forward link was not as critical as the power control on the reverse link, and a relatively slow power control update scheme was employed (typically less than 1 hertz). In a recent PCS (personal communication system) standard J-STD-008, a power control update scheme on the forward link was adapted which allows an update rate of 50 hertz. The electromagnetic wave phenomena known as fast fading cannot be adequately addressed by a forward link power control update scheme operating at relatively slow rates, such as less then 50 hertz. This has resulted in requiring relatively high power for forward traffic channels to reduce errors below an acceptable rate. However, raising power for the forward traffic channels reduces the forward channel capacity significantly.

To improve the above problems, a CDMA standard, W-CDMA, has recently been proposed to increase the speed of the forward power control up to 800 hertz. A mobile station estimates the quality of the forward link in a well known closed loop power control scheme and sends forward power control command bits to one or more base stations depending on whether the mobile station is in a handoff state or not. These power control command bits are sent at a rate of 800 hertz and are sent via the control channel of the reverse link.

In the proposed W-CDMA standard, the reverse channel has two major subchannels: the access channel and the traffic channel. The traffic channel, in turn, has four subchannels: the pilot channel, the fundamental channel, the supplemental channel, and the control channel. In the proposed W-CDMA standard, the same power control bits are sent to all base stations when the mobile station is in the handoff state. Thus, the W-CDMA standard power control scheme does not allow independent base station power control when a mobile station is in a handoff state. This results in some base stations transmitting more power than needed. As a consequence, the interference level to other mobile stations caused by forward link increases and thus results in a lower channel capacity.

The current proposed control channel structure implemented in the mobile station for the W-CDMA standard is illustrated in FIG. 2. Ten bits of control information relating to the fundamental and supplemental channels are sent to a cyclic redundancy checker (CRC) 50 to detect error states. The output of the CRC 50 is fed into an encoder tail 60. The output of the encoder tail 60 is sent into a convolutional encoder 70. The output of the convolutional encoder 70 is sent into a mux 80. Sixteen power control bits (PCBs) per 20 milliseconds or, 1 power control bit (PCB) per 1.25 milliseconds is fed into repetition block 90. The output of the repetition block is sent into mux 80 so that there are three power control bits for every information bit, and the output the mux 80 is 384 bits. For further description of the control channel structure and the components comprising the control channel structure, please see TIA/EIA/IS-95A Standard (herein incorporated by reference).

What results is a control channel structure which does not allow independent base station power control, because the power control command bits sent to the base stations are generated based on the aggregated quality of two or more signals received from multiple base stations.

What is needed is a new fast forward power control scheme for CDMA-based communication systems which allows optimized, individual base station power control. This provides a reduced interference level on the forward link which, in turn, increases channel capacity for the forward link.

SUMMARY OF THE INVENTION

Accordingly, the present invention provides a system and method for controlling power on the forward link of a CDMA-based communication system by allowing independent base station power control when a mobile station is in a handoff state.

The present invention further provides a CDMA system comprising a multiplicity of base stations operating to produce a combined forward power level, each one of the multiplicity of base stations having a set of control bits; and a mobile station in electronic communication with the multiplicity of base stations, the mobile stations capable of measuring the combined forward power level, and the mobile station acting to independently adjust the value of each one of the sets of power control bits based upon the combined forward power level.

In addition, the present invention provides a CDMA system wherein the mobile station compares the combined forward power level to a threshold and adjusts the value of each one of the sets of power control bits to command each one of the multiplicity of base stations to power down if the combined forward power level is greater than the threshold.

The present invention further provides a CDMA system wherein each one of the multiplicity of base stations has a forward link pilot signal strength, and wherein the mobile station compares the relative levels of each one of said forward link pilot signal strengths to determine which one of the multiplicity of base stations has a maximum forward link pilot signal strength. The mobile station may compare the combined forward power level to a threshold and adjust the value of each one of the sets of power control bits to command selected ones of the multiplicity of base stations to power down and one of the multiplicity of base stations having the maximum forward link pilot signal strength to power up if the combined forward power level is less than or equal to the threshold.

The present invention additionally provides a CDMA system wherein one of the multiplicity of base stations has a maximum forward link pilot signal strength, and wherein the mobile station compares the combined forward level to a threshold and adjusts the value of each one of the sets of power control bits to command selected ones of the multiplicity of base stations to power down and one of the multiplicity of base stations having the maximum forward link pilot signal strength to power up if the combined forward power level is less than or equal to the threshold.

In addition, the present invention provides a CDMA system comprising a multiplicity of base stations operating to produce a combined forward power level, each one of the multiplicity of base stations being associated with a set of power control bits; and a mobile station in electronic communication with a multiplicity of base stations, the mobile station configured to independently adjust the value of each one of the sets of power control bits based upon the combined forward power level. The mobile station may compare the combined forward power level to a threshold and adjust the value of each one of the sets of power control bits to command each one of the multiplicity of base stations to power down if the combined forward power level is greater than the threshold. Further, each one of the multiplicity of base stations may have a forward link pilot signal strength, wherein the mobile station compares the relative levels of each one of the forward link pilot signal strengths to determine which one of the multiplicity of base stations has a maximum forward link pilot signal strength. The mobile station may compare the combined forward power level to a threshold and adjust the value of each one of the sets of power control bits to command selected ones of the multiplicity of base stations to power down and the one of the multiplicity of base stations having the maximum forward link pilot signal strength to power up if the combined forward power level is less than or equal to the threshold.

The present invention further provides a CDMA system wherein one of the multiplicity of base stations has a maximum forward link pilot signal strength, and wherein the mobile station compares the combined forward power level to a threshold and adjusts the value of each one of the sets of power control bits to command selected ones of the multiplicity of base stations to power down and the one of the multiplicity of base stations having the maximum forward link pilot signal strength to power up if the combined forward power level is less than or equal to the threshold. In addition, the CDMA system of the present invention may operate so that each one of the multiplicity of base stations stores and maintains one of the sets of power control bits.

The present invention also provides a method of operating a CDMA system comprising the steps of maintaining a multiplicity of base stations operating to produce a combined forward power level, each one of the multiplicity of base stations being associated with a set of power control bits; maintaining a mobile station in electronic communication with the multiplicity of base stations; configuring the mobile station to independently adjust the value of each one of the sets of power control bits based upon the combined forward power level; and adjusting the value of each one of the sets of power control bits based upon the combined forward power level. The method may further comprise the steps of comparing the combined forward power level to a threshold; and adjusting the value of each one of the sets of power control bits to command each one of the multiplicity of base stations to power down if the combined forward power level is greater than the threshold.

The present invention may also provide a method of operating a CDMA system wherein each one of the multiplicity of base stations has a forward link pilot signal strength, further comprising the step of comparing the relative levels of each one of the forward link pilot signal strengths to determine which one of the multiplicity of base stations has a maximum forward length pilot signal strength. The method may further comprise the step of comparing the combined forward power level to a threshold and adjusting the value of each one of the sets of power control bits to command selected ones of the multiplicity of base stations to power down and the one of the multiplicity of base stations having the maximum forward link pilot signal strength to power up if the combined forward power level is less than or equal to the threshold.

In addition, the present invention may provide a method of operating a CDMA system wherein one of the multiplicity of base stations has a maximum forward link pilot signal strength, further comprising the step of comparing the combined forward power level to a threshold and adjusting the value of each one of the sets of power control bits to command selected ones of the multiplicity of base stations to power down and the one of the multiplicity of base stations having the maximum forward link pilot signal strength to power up if the combined forward power level is less than or equal to the threshold. The method may further comprise the step of storing and maintaining the sets of power control bits within the multiplicity of base stations.

The present invention also provides a method of operating a CDMA system comprising the steps of measuring a combined forward power level of a multiplicity of base stations, each one of the base stations having a set of power control bits; comparing the combined forward power level to a threshold; and adjusting the value of each one of the sets of power control bits independently to command each one of the multiplicity of base stations to power down if the combined forward power level is greater than the threshold.

Further, the present invention provides a method of operating a CDMA system comprising the steps of measuring a combined forward power level of a multiplicity of base stations, each one of the multiplicity of base stations having a set of power control bits and a forward link pilot signal strength; comparing the combined forward power level to a threshold; comparing the relative levels of each one of the forward link pilot signal strengths to determine which one of the multiplicity of base stations has a maximum forward link pilot signal strength; and adjusting the value of each one of the sets of power control bits independently to command selected ones of the multiplicity of base stations to power down and to command the one of the multiplicity of base stations having a maximum forward link pilot signal strength to power up if the combined forward power level is less than or equal to the threshold. The method may further comprise the step of adjusting the value of each one of the sets of power control bits independently to command each one of the multiplicity of base stations to power down if the combined forward power level is greater than the threshold.

One advantage of the present invention is the reduction of interference with other mobile stations in a base station cell when a second mobile station is in a handoff state.

Another advantage of the present invention is increased forward link channel capacity.

Another advantage of the present invention is the reduction of the total required forward channel power.

DETAILED DESCRIPTION OF A PREFERRED EMBODIMENT OF THE INVENTION

Figure 3:
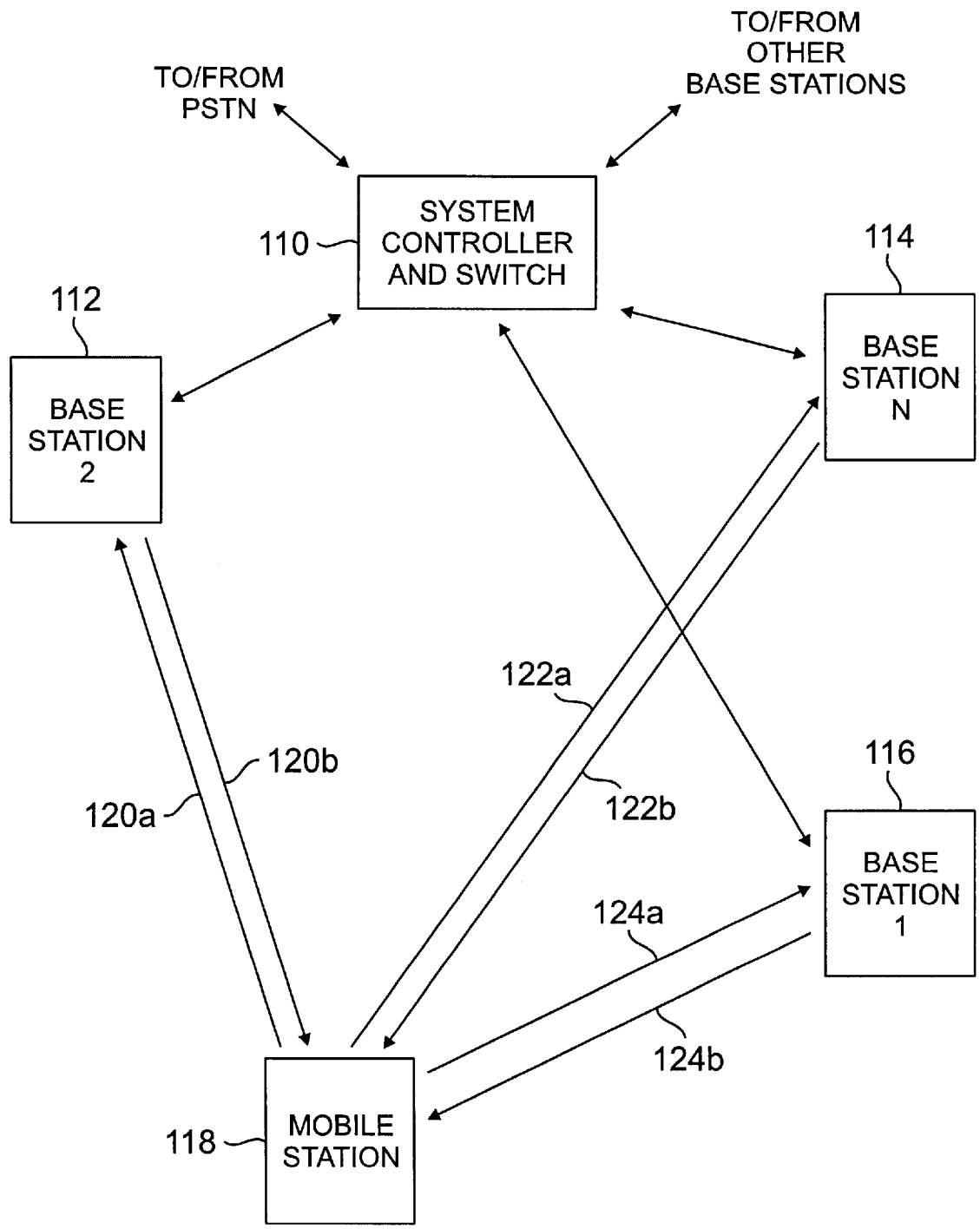
FIG. 3 is a schematic overview of an exemplary CDMA communication network in accordance with the present invention.

An exemplary telephone system in which the present invention is embodied is illustrated in FIG. 3. The system illustrated in FIG. 3 utilizes CDMA modulation techniques for communication between the system mobile stations, units or telephones, and the cell-sites or base stations. Cellular systems in large cities may have hundreds of cell-site stations serving hundreds of thousands of mobile telephones. The use of CDMA techniques readily facilitates increases in user capacity in systems of this size as compared to conventional FM modulation cellular systems.

In FIG. 3, the system controller and switch 110, also referred to as a mobile telephone switching office (MTSO), typically includes interface and processing circuitry for providing system control to the cell-sites or base stations. Controller 110 also controls the routing of telephone calls from the Public Switched Telephone Network (PSTN) to the appropriate base station for transmission to the appropriate mobile station. Controller 110 also controls the routing of calls from the mobile stations, via at least one base station, to the PSTN. Controller 110 may direct calls between mobile users via the appropriate base stations, since such mobile stations typically do not communicate directly with one another.

Controller 110 may be coupled to the base stations by various means such as dedicated telephone lines, optical fiber links or by microwave communication links. It will be appreciated that system controller and switch 110 may be integrated with any number of base stations. In FIG. 3, three such exemplary base stations 112, 114, and 116 along with an exemplary mobile station 118, which includes a cellular telephone, are illustrated. Arrows 120a–120b define the possible communication link between base station 112 and mobile station 118. Arrows 122a–122b define the possible communication link between base station 114 and mobile station 118. Similarly, arrows 124a–124b define the possible communication link between base station 116 and mobile station 118.

The cell-site or base station service areas or cells are designed in geographic shapes such that the mobile station will normally be closer to one cell-site than another. When the mobile station is idle, i.e., no calls are in progress, the mobile station constantly monitors the pilot signal transmissions from each nearby base station. As illustrated in FIG. 3, the pilot signals are respectively transmitted to mobile station 118 by base stations 112, 114, and 116, respectively, upon forward communication links 120b, 122b, and 124b. The mobile station then determines which cell it is in by comparing pilot signal strength transmitted from the corresponding cell-sites.

In the example illustrated in FIG. 3, mobile station 118 may be considered closest to base station 116. When mobile station 118 initiates a call, a control message is transmitted to the nearest base station, base station 116. Base Station 116, upon receiving the call request message, signals system controller 110 and transfers the call number. System controller 110 then connects the call through the PSTN to the intended recipient.

Should a call be initiated within the PSTN, controller 110 transmits the call information to all the base stations in the area. The base stations in turn transmit a paging message to the intended recipient mobile station. When the mobile station hears a page message, it responds with a control message that is transmitted to the nearest base station. This control message signals the system controller that this particular base station is in communication with the mobile station. Controller 110 then routes the call through this base station to the mobile station.

Should mobile station 118 move out of the coverage area of the initial base station, base station 116, an attempt is made to continue the call by routing the call through another base station. In the handoff process or state, there are different methods of initiating the handoff, or routing through another base station.

In a mobile station initiated handoff, the mobile station is equipped with a search receiver which is used to scan the pilot signal transmission of neighboring base stations 112 and 114 in addition to performing other functions. If the pilot signal strength of base stations 112 and 114 is found to be stronger than the pilot signal strength of base station 116, mobile station 118 transmits a control message to the current base station, base station 116. This control message contains information identifying the base station of greater signal strength in addition to information requesting a handoff to this base station. The current base station 116 then transfers this control message to controller 110.

According to the present invention, each base station is assigned a set of power control bits to be transmitted upon the mobile station reverse link. This arrangement allows a mobile station to communicate with each base station independently, regarding whether to increase or decrease the base station power. In this manner, the power for each forward link can be controlled independently. Thus, the power of a first base station may be increased, while the power of a second base station may be decreased to minimize the interference to other mobile stations which are not in the handoff state.

Figure 1:
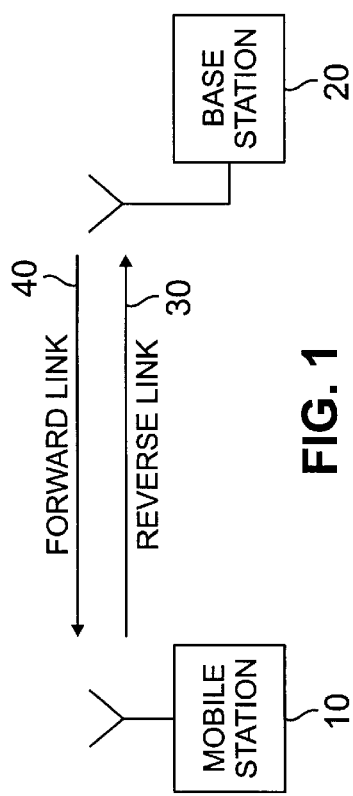
FIG. 1 is a prior art graphical representation of a CDMA-based communication system.
Figure 2:
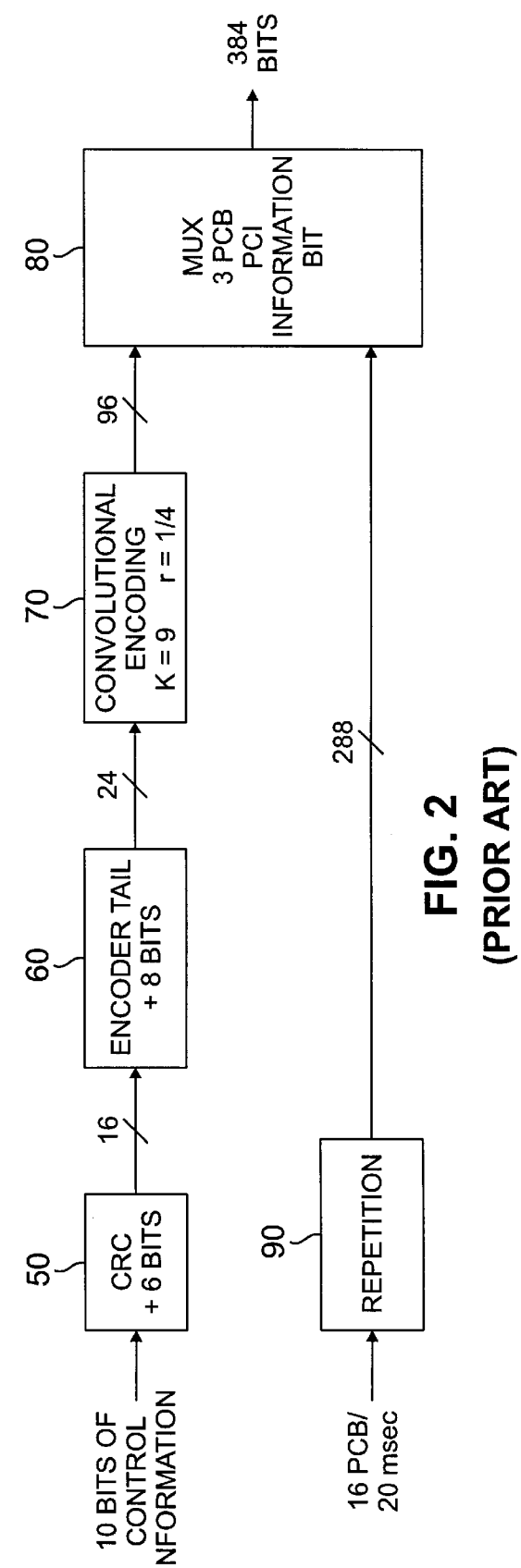
FIG. 2 is a prior art block diagram illustrating the control channel structure utilized in the reverse channel of the W-CDMA standard.
Figure 4:
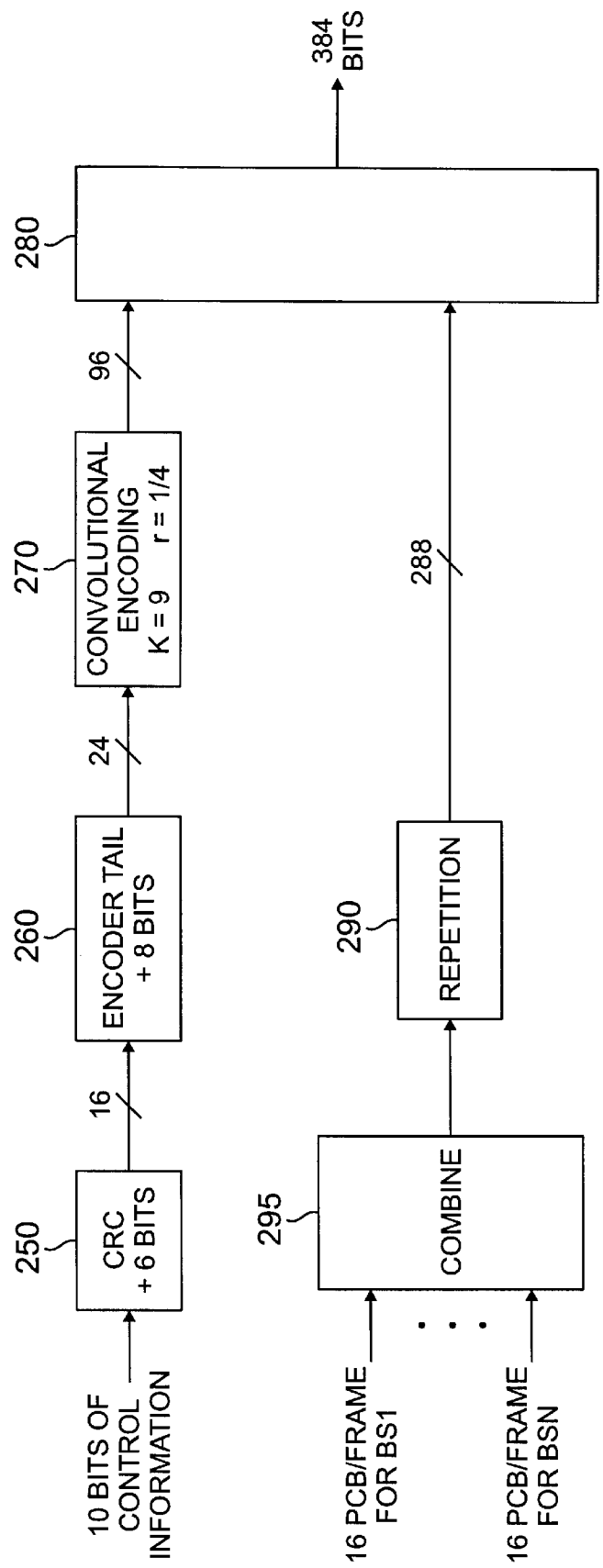
FIG. 4 is a block diagram representation of a control channel structure according to the present invention.

FIG. 4 is a block diagram illustrating the structure of a control channel according to the present invention. Reference numerals utilized in FIG. 4 which are like, similar, or identical to reference numerals utilized in FIG. 2 indicate like, similar, or identical components. FIG. 4 is virtually identical to FIG. 2 except for the following noted difference: combination block 295 combines 16 bits per frame for base station 1 (BS1) with 16 bits per frame for each base station up to base station n (BSn), wherein one frame is transmitted within 20 milliseconds. Power control bits for BS1, power control bits for BS2, . . . , through power control bits for BSn, may each be generated in the mobile station utilizing the control channel structure illustrated in FIG. 4.

Combined function block 295 may generate multilevel bits. For example, Pulse Amplitude Modulation (PAM) may be utilized to send the power control bits.

The number of different sets of power control bits will probably be limited, assuming the power allocated to all of the control bits in a 1.25-millisecond period remains constant. This is because all power control bits are sent within 1.25 milliseconds; e.g., 2 control bits may be sent per 1.25 milliseconds, wherein one power control bit is assigned to a first base station and a second power control bit assigned to a second base station; and 3 power control bits may be sent per 1.25 milliseconds wherein one power control bit would be sent to a first base station, a second power control bit would be sent to a second base station, and a third power control bit would be sent to a third base station, etc. If the power allocated to all of the control bits remain constant within the 1.25-millisecond period, then the practical limit may be, for example, 3 or 4 power control bits per 1.25 milliseconds, since the receiving base station may not be able to detect its assigned power control bit due to the reduced individual bit power level caused by dividing up the total power allocated to one frame equally between each PCB.

According to the present invention, the power level of the power control bits may be controlled independently from the 10 bits of control information as seen in the structure of the control channel to achieve n power control bits per 1.25 milliseconds or, in other words, to control n base stations.

According to the present invention, there are two rules for generation of the power control bits for different base stations by a mobile station.

Rule 1: If the combined forward channel power exceeds some predetermined threshold, the mobile station should generate power control bits to command all base stations to power down (decrease power of their respective forward channels).

Rule 2: If the combined forward channel power is less than or equal to a predetermined threshold, the mobile station should prioritize the strength of the pilot signal of the forward link $$\left(\frac{E_c}{I_o}\right)$$

for all related base stations in the handover state. The mobile station should then set the power control bit of the base $$\frac{E_c}{I_o}$$

to power up (increase power of the respective forward channel) and the other base stations to power down.

Figure 5A:
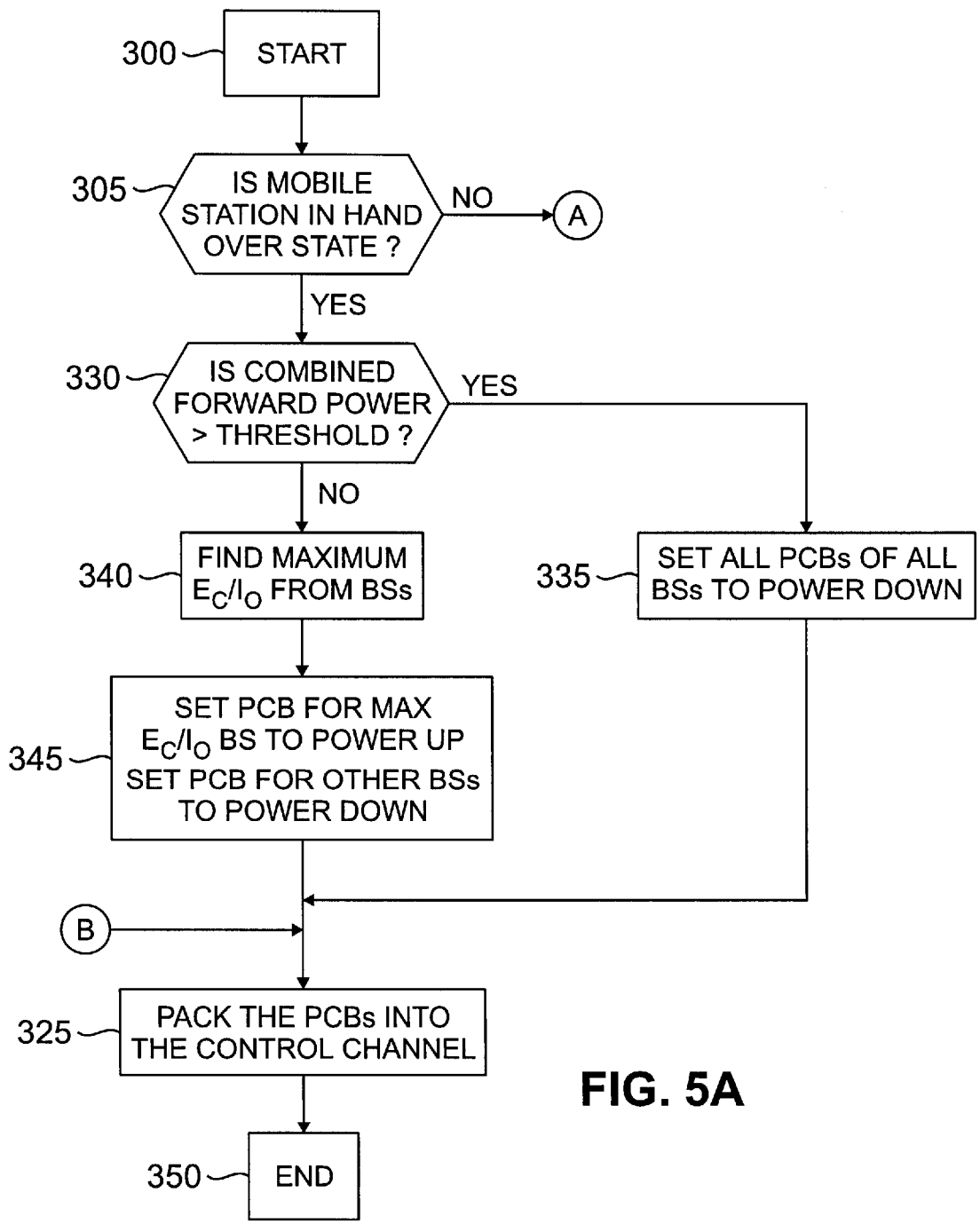
FIGS. 5A and 5B are a flowchart illustrating a method according to the present invention.
Figure 5B:
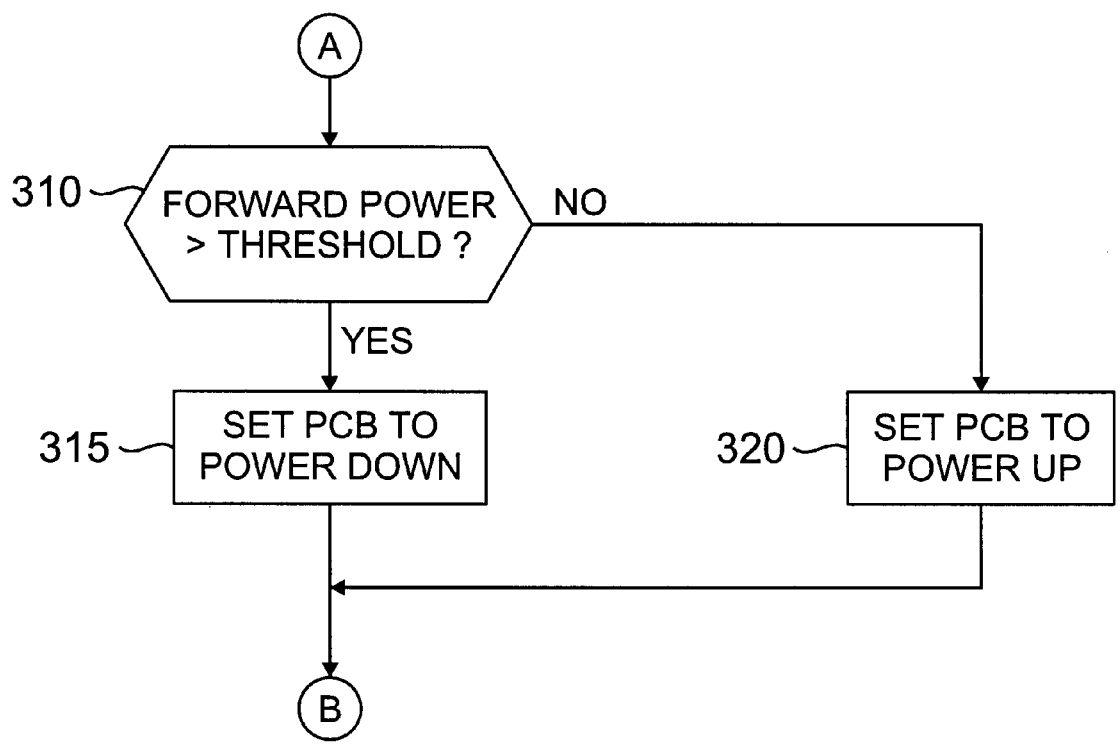

These rules and a method according to the present invention are illustrated in the flowchart of FIGS. 5A and 5B. The method starts at step 300. In step 305, it is determined whether the mobile station is in a handover state. If the mobile station is not in a handover state, the process proceeds to step 310, wherein the forward power is compared to a predetermined threshold value. If, the forward power is greater than the predetermined threshold value, the process proceeds to step 315, wherein the power control bits are set to power down. If the forward power is not greater than the threshold, the process proceeds to step 320, wherein the power control bits are set to power up. After setting the power control bits to power down in step 315 or to power up in step 320, the process proceeds to step 325 where all of the power control bits are packed into the control channel according to the control channel structure illustrated in FIG. 4 so that the power control bits can be transmitted from the mobile station to the corresponding base stations.

If the mobile station is in the handover state as determined in step 305, the process proceeds to step 330, wherein the combined forward power is compared to a predetermined threshold. If the combined forward power is greater than the predetermined threshold, the process proceeds to step 335. In step 335, all of the power control bits of all the base stations are set to power down, and the process then proceeds to step 325, where all the power control bits are packed into the control channel. If the combined forward power is not greater than the threshold, as determined in step 330, the process proceeds to step 340, where the maximum $$\frac{E_c}{I_o}$$

from all related base stations is determined. The process then proceeds to step 345, where the power control bit for the maximum $$\frac{E_c}{I_o}$$

base station is set to power up, and the power control bits for the other base stations are set to power down. The process then proceeds to step 325, where all the power control bits are packed into the control channel. The process ends in step 350.

Although the present invention and its advantages have been described in detail, it should be understood that various changes, substitutions and alterations can be made herein without departing from the spirit or scope of the invention as defined in the appended claims.

What is claimed is:

1. A code division multiple access (CDMA) system comprising:
   a multiplicity of base stations operating to produce a combined forward power level, each one of said multiplicity of base stations having a set of power control bits; and
   a mobile station in electronic communication with said multiplicity of base stations, said mobile station capable of measuring said combined forward power level, and said mobile station acting to independently adjust the value of each one of said sets of power control bits based upon said combined forward power level.

2. The CDMA system set forth in claim 1, wherein said mobile station compares the combined forward power level to a threshold and adjusts the values of each one of said sets of power control bits to command each one of said multiplicity of base stations to power down if said combined forward power level is greater than the threshold.

3. The CDMA system set forth in claim 1, wherein each one of said multiplicity of base stations has a forward link pilot signal strength, and wherein said mobile station compares the relative levels of each one of said forward link pilot signal strengths to determine which one of said multiplicity of base stations has a maximum forward link pilot signal strength.

4. The CDMA system set forth in claim 3, wherein said mobile station compares the combined forward power level to a threshold and adjusts the value of each one of said sets of power control bits to command selected ones of said multiplicity of base stations to power down and said one of said multiplicity of base stations having the maximum forward link pilot signal strength to power up if said combined forward power level is less than or equal to the threshold.

5. The CDMA system set forth in claim 1, wherein one of said multiplicity of base stations has a maximum forward link pilot signal strength, and wherein said mobile station compares the combined forward power level to a threshold and adjusts the value of each one of said sets of power control bits to command selected ones of said multiplicity of base stations to power down and said one of said multiplicity of base stations having the maximum forward link pilot signal strength to power up if said combined forward power level is less than or equal to the threshold.

6. A code division multiple access (CDMA) system comprising:
   a multiplicity of base stations operating to produce a combined forward power level, each one of said multiplicity of base stations being associated with a set of power control bits; and
   a mobile station in electronic communication with said multiplicity of base stations, said mobile station configured to independently adjust the value of each one of said sets of power control bits based upon said combined forward power level.

7. The CDMA system set forth in claim 6, wherein said mobile station compares the combined forward power level to a threshold and adjusts the value of each one of said sets of power control bits to command each one of said multiplicity of base stations to power down if said combined forward power level is greater than the threshold.

8. The CDKA system set forth in claim 6, wherein each one of said multiplicity of base stations has a forward link pilot signal strength, and wherein said mobile station compares the relative levels of each one of said forward link pilot signal strengths to determine which one of said multiplicity of base stations has a maximum forward link pilot signal strength.

9. The CDMA system set forth in claim 8, wherein said mobile station compares the combined forward power level to a threshold and adjusts the value of each one of said sets of power control bits to command selected ones of said multiplicity of base stations to power down and said one of said multiplicity of base stations having the maximum forward link pilot signal strength to power up if said combined a forward power level is less than or equal to the threshold.

10. The CDM system set forth in claim 6, wherein one of said multiplicity of base stations has a maximum forward link pilot signal strength, and wherein said mobile station compares the combined forward power level to a threshold and adjusts the value of each one of said sets of power control bits to command selected ones of said multiplicity of base stations to power down and said one of said multiplicity of base stations having the maximum forward link pilot signal strength to power up if said combined forward power level is less than or equal to the threshold.

11. The CDMA system set forth in claim 6, wherein each one of said multiplicity of base stations stores and maintains one of said sets of power control bits.

12. A method of operating a CMA system comprising the steps of:
   measuring a combined forward power level of a multiplicity of base stations, each one of said multiplicity of base stations having a set of power control bits;
   comparing the combined forward power level to a threshold; and
   adjusting the value of each one of said sets of power control bits independently to command each one of said multiplicity of base stations to power down if said combined forward power level is greater than the threshold.

13. A method of operating a CDMA system comprising the steps of:
   measuring a combined forward power level of a multiplicity of base stations, each one of said multiplicity of base stations having a set of power control bits and a forward link pilot signal strength;
   comparing the combined forward power level to a threshold;
   comparing the relative levels of each one of said forward link pilot signal strengths to determine which one of said multiplicity of base stations has a maximum forward link pilot signal strength; and
   adjusting the value of each one of said sets of power control bits independently to command selected ones of said multiplicity of base stations to power down and said one of said multiplicity of base stations having a maximum forward link pilot signal strength to power up if said combined forward power level is less than or equal to the threshold.

14. The method of operating a CDMA system as set forth in claim 13, further comprising the step of adjusting the value of each one of said sets of power control bits independently to command each one of said multiplicity of base stations to power down if said combined forward power level is greater than the threshold.

15. A method of operating a code division multiple access (CDMA) system comprising the steps of:
   maintaining a multiplicity of base stations operating to produce a combined forward power level, each one of said multiplicity of base stations being associated with a set of power control bits;
   maintaining a mobile station in electronic communication with said multiplicity of base stations;
   configuring said mobile station to independently adjust the value of each one of said sets of power control bits based upon said combined forward power level; and
   adjusting the value of each one of said sets of power control bits based upon said combined forward power level.

16. The method of operating a CDMA system as set forth in claim 15, further comprising the steps of:
comparing the combined forward power level to a threshold; and
adjusting the value of each one of said sets of power control bits to command each one of said multiplicity of base stations to power down if said combined forward power level is greater than the threshold.

17. The method of operating a CDMA system as set forth in claim 15, wherein each one of said multiplicity of base stations has a forward link pilot signal strength, further comprising the step of:
comparing the relative levels of each one of said forward link pilot signal strengths to determine which one of said multiplicity of base stations has a maximum forward link pilot signal strength.

18. The method of operating a CDMA system as set forth in claim 17, further comprising the step of:
comparing the combined forward power level to a threshold and adjusting the value of each one of said sets of power control bits to command selected ones of said multiplicity of base stations to power down and said one of said multiplicity of base stations having the maximum forward link pilot signal strength to power up if said combined forward power level is less than or equal to the threshold.

19. The method of operating a CDMA system as set forth in claim 15, wherein one of said multiplicity of base stations has a maximum forward link pilot signal strength, further comprising the step of:
comparing the combined forward power level to a threshold and adjusting the value of each one of said sets of power control bits to command selected ones of said multiplicity of base stations to power down and said one of said multiplicity of base stations having the maximum forward link pilot signal strength to power up if said combined forward power level is less than or equal to the threshold.

20. The method of operating a CDMA system as set forth in claim 15, further comprising the step of:
storing and maintaining said sets of power control bits within said multiplicity of base stations.

* * * * *

UNITED STATES PATENT AND TRADEMARK OFFICE
CERTIFICATE OF CORRECTION

PATENT NO.  : 6,304,562 B1
DATED       : October 16, 2001
INVENTOR(S) : Youngky Kim; Jaemin Ahn; Heewon Kang It is certified that error appears in the above-identified patent and that said Letters Patent is hereby corrected as shown below:

Column 9, claim 8,
Line 55, delete "CDKA" and insert -- CDMA --.

Column 10, claim 10,
Line 4, delete "CDM" and insert -- CDMA --.

Column 10, claim 12,
Line 16, delete "CMA" and insert -- CDMA --.

Signed and Sealed this

Twenty-sixth Day of March, 2002

Attest:

*Attesting Officer*

JAMES E. ROGAN
*Director of the United States Patent and Trademark Office*